UNITED STATES PATENT OFFICE.

FREDERICK S. BARFF, OF KILBURN, ENGLAND.

IMPROVEMENT IN PRESERVING ANIMAL AND VEGETABLE SUBSTANCES.

Specification forming part of Letters Patent No. 188,093, dated March 6, 1877; application filed August 14, 1876.

*To all whom it may concern:*

Be it known that I, FREDERICK SETTLE BARFF, of Kilburn, in the county of Middlesex, England, professor of chemistry, have invented Improvements in Preserving Animal and Vegetable Matters, and in the means and apparatus employed therein, of which the following is a specification:

This invention relates to the preservation of animal and vegetable substances, whether for use as food or for other purposes, so as to preserve the food—meat, fish, vegetables, and fruit—either in transit from foreign countries to this country, or vice versa, or from one country to another. It further relates to the preservation, for a longer or shorter time, of such animal and vegetable substances as are usually contained in butchers', fishmongers', poulterers', fruiterers', and green-grocers' shops; also, to the preservation of such or similar substances either in private houses, in suitable safes, or in public institutions; and also to the preservation of vegetable and animal substances or products when employed for other purposes than food, such, for example, as flowers for sale or for decorative purposes; also skins, either in the dry or in the wet state; also specimens in zoölogical or pathological museums, or in botanical collections; and consists in the mode or process of employing, in the manner substantially as hereinafter described, chemical compounds or elements which are able to absorb oxygen gas when existing in the atmosphere, or when in a free state—such, for example, as soluble metallic salts, or compounds which are capable of absorbing oxygen, or salts of metallic or other oxides which, when decomposed, set free an oxide which is capable of assuming a higher state of oxidation, and in consequence readily taking up the oxygen from the air, or when existing in a free state—that is to say, for example, protosalts of metals, such as the protochloride of manganese; also, such salts as, for example, pyrogallate of potash or of soda, which, as is well known, readily absorb oxygen. When I employ the proto or lower oxygen compounds of the metals, (as, for example, in the case of manganese,) I prefer to employ the hydrated protoxide or lower oxides of the same, in conjunction with an absorbing material or diluent, so that such hydrated oxide or oxides may be more readily capable of absorbing oxygen.

When I employ other metallic salts or compounds, such, for example, as the protosulphate of iron, or the protoxide obtained by means of a base therefrom, I employ them in conjunction with absorbent material; and, in order to prepare such oxygen-absorbing material or agent, I mix the metallic salt, (either in solution or in a solid condition,) or compound with a substance which shall act as a diluent, and freely admit the ingress of the atmosphere.

In order to obtain such before-mentioned hydrated protoxides or lower oxides, I prefer to precipitate such hydrated oxides by means of lime or by means of soda-lime from their salts, which lime or soda-lime I use in sufficient quantity to completely decompose the protosalts employed. I prefer in every case to add a slight excess of the precipitant. The same preservative effect may be attained by the conservative materials in a state of agitation. I also use any other precipitant capable of effecting the liberation of the hydrated proto-oxides, or of the lower hydrated oxides, such, for example, as caustic soda or caustic potash, or of hydrate of baryta, or of carbonate of lime or of baryta, or of mixtures of the same.

By the use of one or more of the before-mentioned substances or compounds, or mixtures of the same, either in solution or in a divided state, I absorb the oxygen contained in air-tight vessels, in which the substances to be preserved are placed, and, moreover, in the case of cellular substances, from the cells of which the residual gases do not at once escape on the absorption of the oxygen in the vessel containing them, I absorb the oxygen of the residual gases as it diffuses out, by using an excess of its absorbent, and until the absorbent is exhausted or has been oxidized, any air entering the vessel will be deprived of its oxygen, and by means of a suitable apparatus attached to the containing-vessel such ingress will be indicated, and thus give timely notice for the addition of a further supply of the absorbing substance, and also for rendering the vessel perfectly air-tight.

As diluents, I employ either bran, or cork, or oak bark, or oak sawdust, or any other vegetable substance containing tannic, gallic, or other analogous acids, as these, when employed either alone or in conjunction with a solution of caustic soda or potash, absorb oxygen, and these I use either alone or in conjunction with the before-mentioned metallic salts or compounds. I thus avail myself of the absorbent action, as before mentioned, of potassic and of sodaic pyrogallates.

In carrying out this invention I prefer to effect the mixture of the preservative agents with the diluents in the vessels containing the substances or materials to be preserved. This I do, either by having a rake, the handle of which passes through an air-tight stuffing-box, and is connected with a vessel which can be arranged as to admit of the introduction of fresh preservative material, and at the same time permitting the impregnation of the oak or cork bark without the admission of air.

Having now described and particularly ascertained the nature of my said invention and the manner in which the same is or may be used or carried into effect, I would observe, in conclusion, that what I consider to be novel and original, and therefore claim as the invention, is—

1. The process of effecting the preservation of animal and of vegetable matters by the employment, in the manner hereinbefore described, in conjunction with diluents, of the hydrated lower metallic oxides, by preference the hydrated lower oxides of manganese, such hydrated oxide or oxides being capable of absorbing oxygen and becoming converted into higher oxides.

2. The process of preserving animal and vegetable substances by the employment, in the manner hereinbefore described, of the lower oxides of manganese and of iron, in conjunction with a diluent.

3. The process of effecting the preservation of animal and of vegetable substances by the employment, in the manner hereinbefore described, of organic salts or compounds which are capable of absorbing oxygen, such, for example, as the tannates, gallates, pyrogallates, or analogous bodies, either employed alone or when contained in or mixed with vegetable or other matters, such, for example, as the lower oxides of manganese.

In witness whereof I have signed my name to this specification in the presence of two subscribing witnesses.

FREDERICK SETTLE BARFF.

Witnesses:
   FREDK. C. DYER,
   CHAS. MILLS,
      *Both of 47 Lincoln's Inn Fields, London.*